Aug. 31, 1943.  L. E. SODERQUIST  2,328,507
TIRE STRIPPING VULCANIZING PRESS
Filed March 2, 1939  5 Sheets-Sheet 1
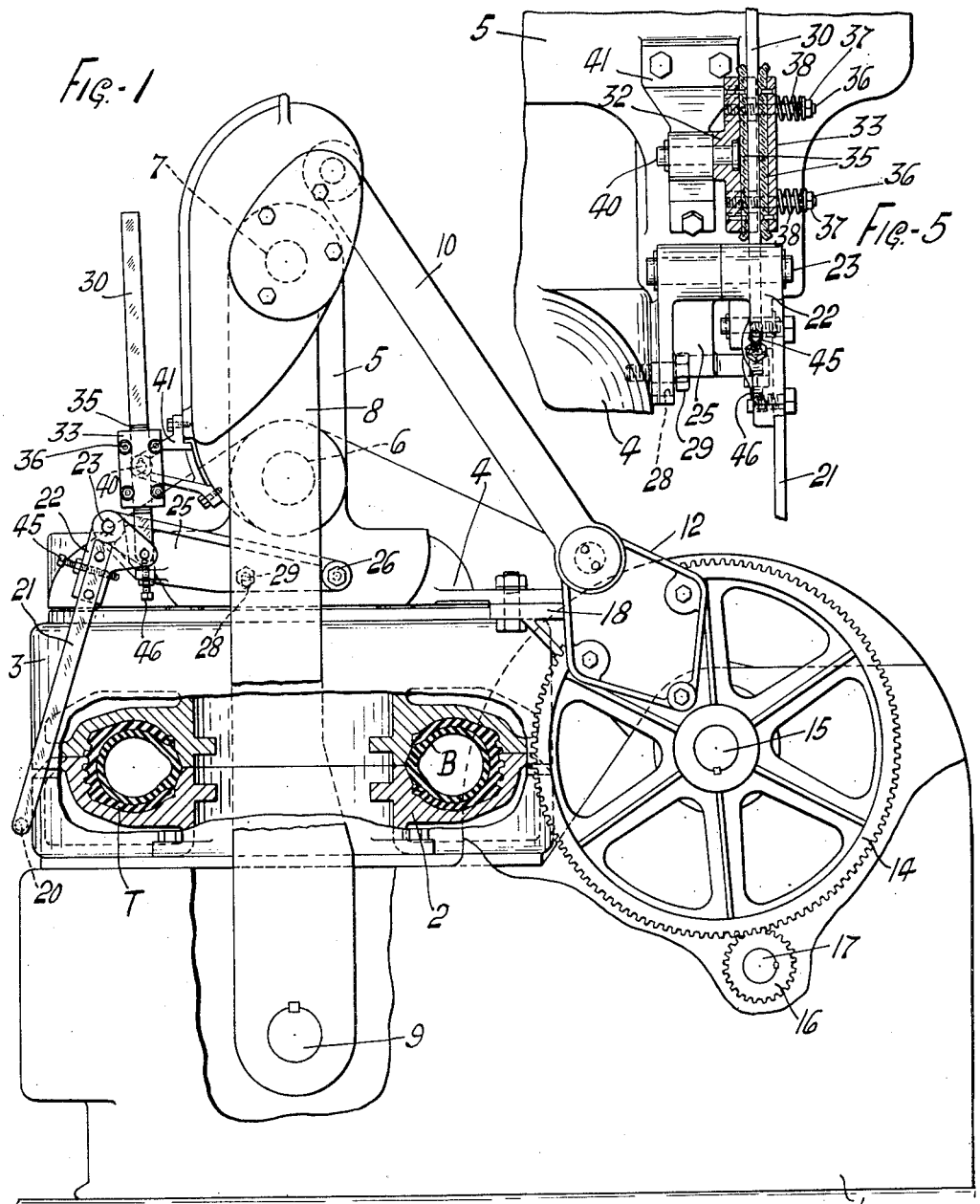
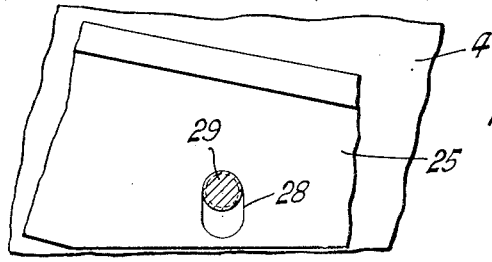
INVENTOR
LESLIE E. SODERQUIST
BY Ely & Frye
ATTORNEYS

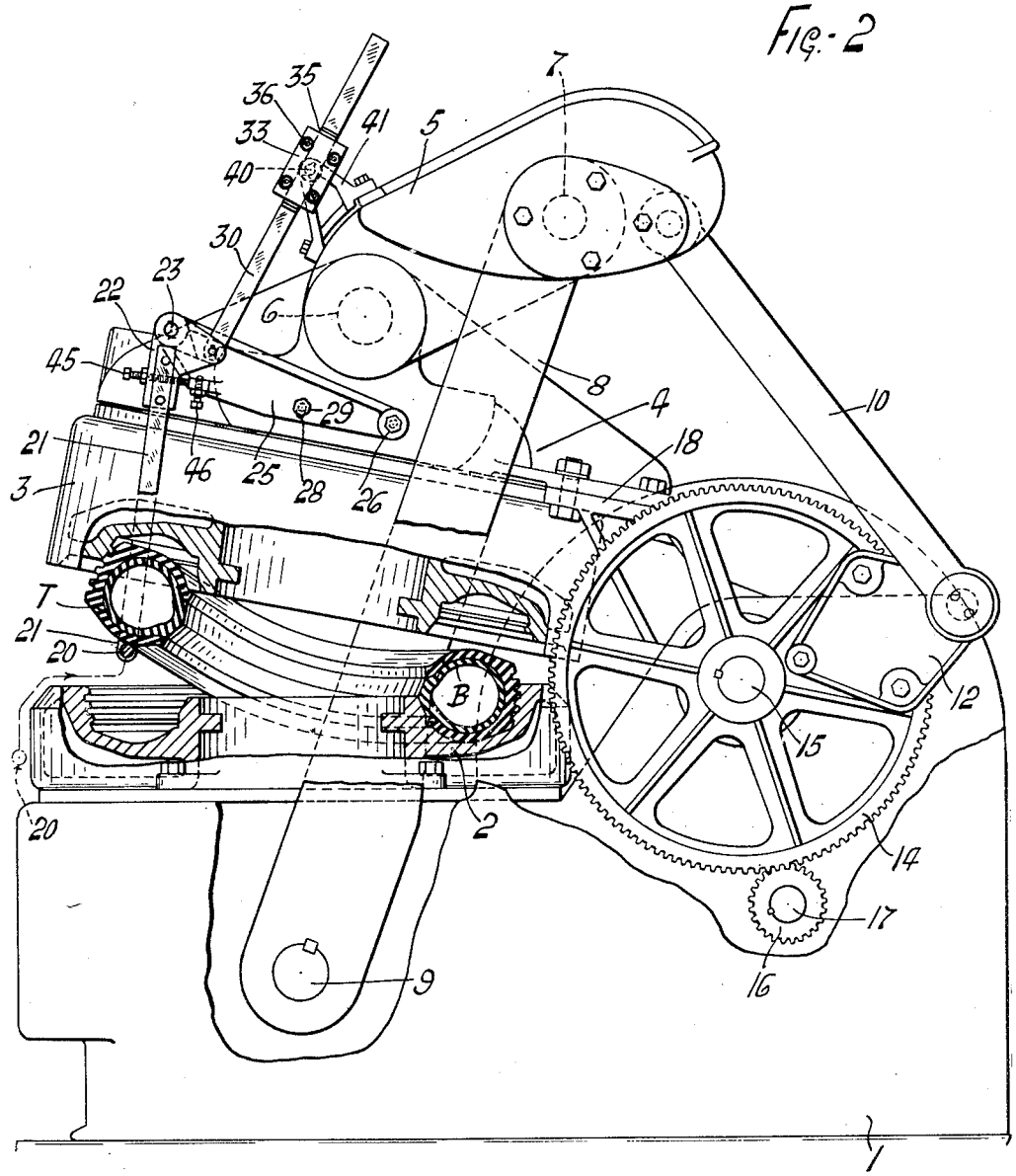

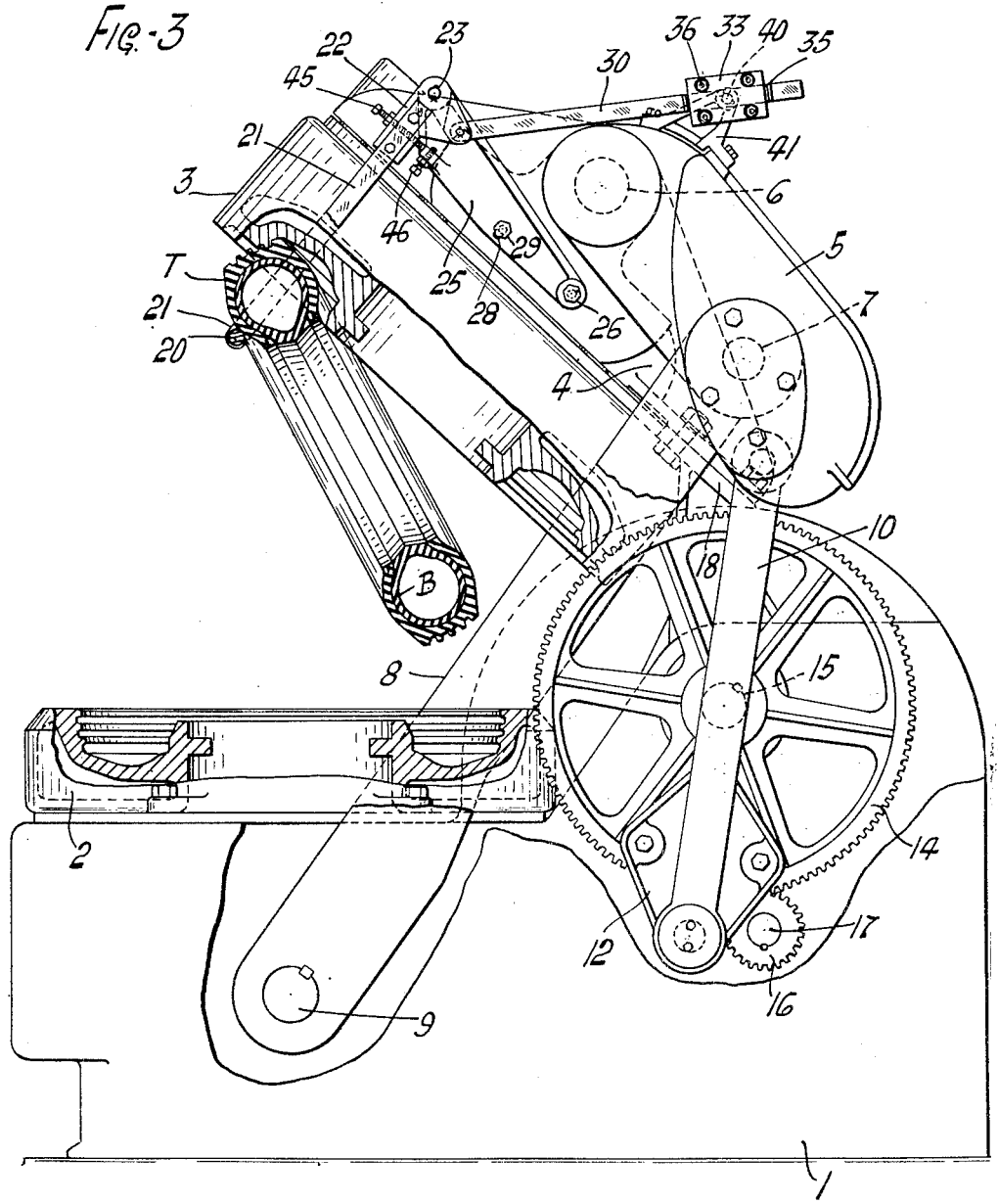

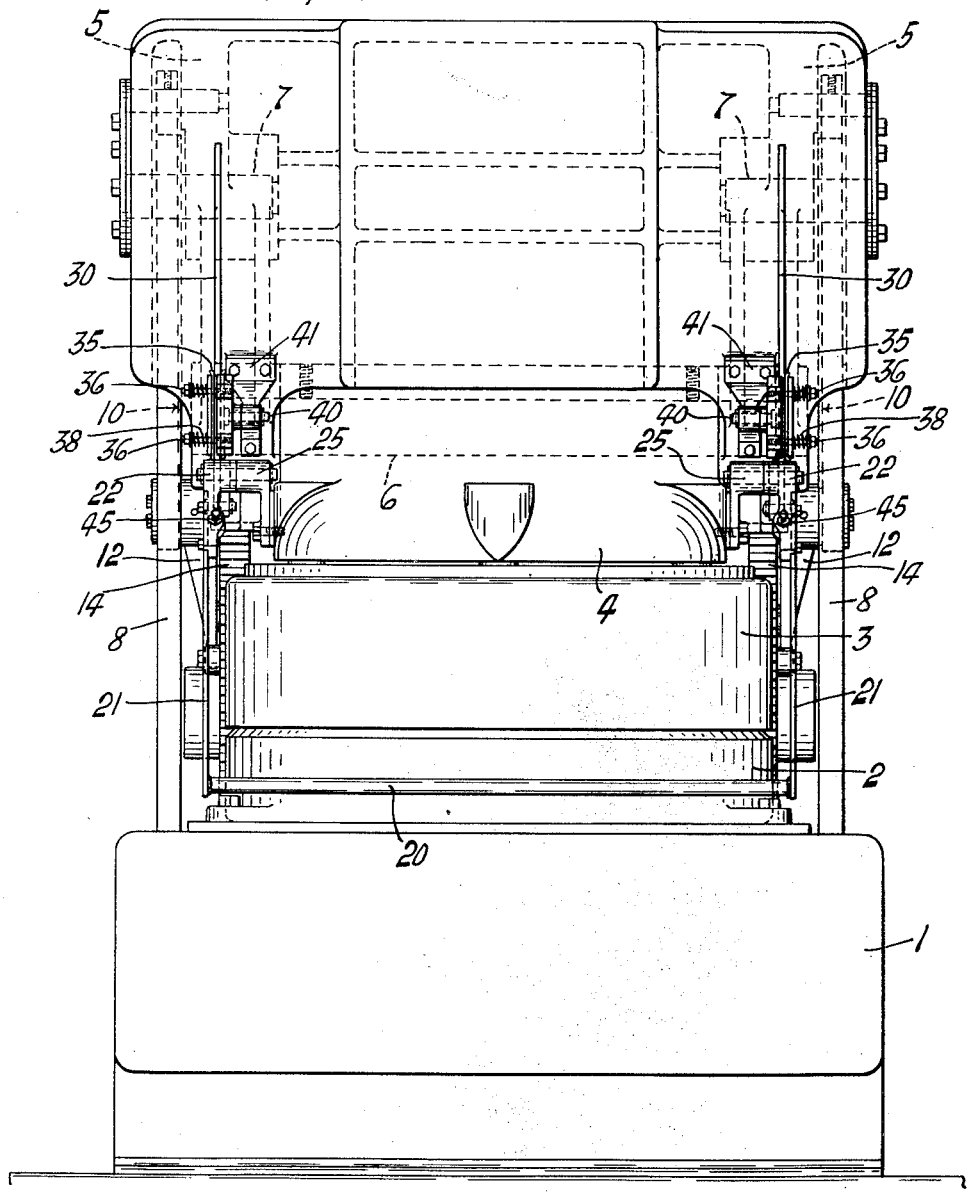

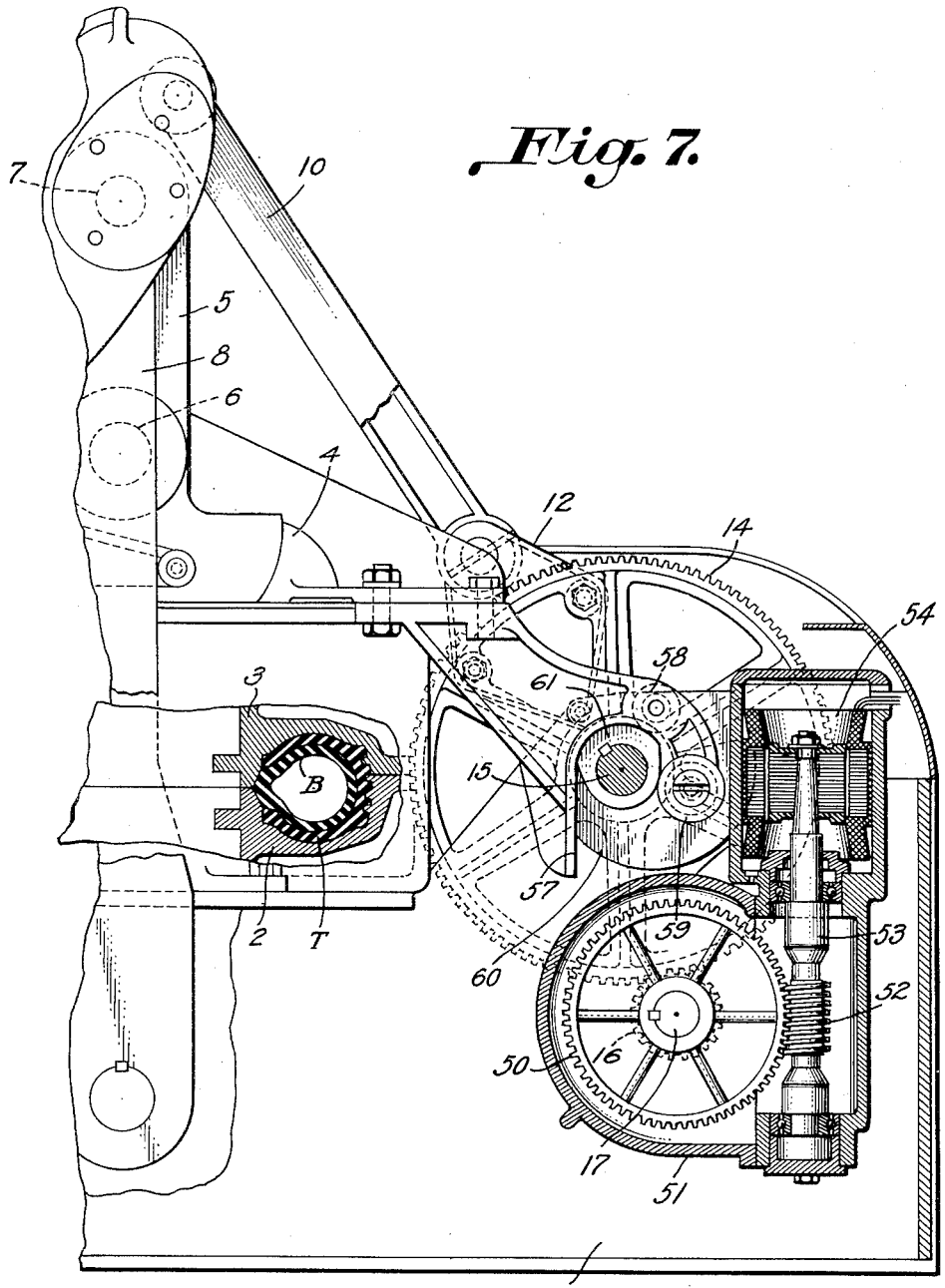

Patented Aug. 31, 1943

2,328,507

UNITED STATES PATENT OFFICE 2,328,507

TIRE STRIPPING VULCANIZING PRESS

Leslie E. Soderquist, Akron, Ohio, assignor to The McNeil Machine & Engineering Company, Akron, Ohio, a corporation of Ohio Application March 2, 1939, Serial No. 259,353

14 Claims. (Cl. 18—17)

The present invention relates to the art of vulcanizing and particularly to the vulcanization of pneumatic tires for automobiles and to presses adapted and intended for that purpose. This invention is in the nature of an improvement or addition to presses of the type in which the tire is stripped or freed from the mold by the opening movement of the press, usually the lateral movement of one mold section relative to the other, the tire being compressed between the upper and lower halves of the mold at the beginning of the opening movement, whereby the tire is lifted from the lower half without any additional operation of the press.

A press of this type is shown and claimed in my prior application for patent, Serial No. 199,417, filed April 1, 1938, but the present invention is not necessarily limited to application on presses having the particular operating mechanism or the exact movement therein disclosed, as it may be adapted to and used upon other presses. For the purpose of illustrating the present invention, the press shown in the above identified application has been selected, and is shown in outline except as to such of the parts as contribute to the operation of the improved attachment, reference being had to the previous application for a further and more detailed showing of the remainder of the mechanism.

It has been found that the mechanism shown in my prior application operates efficiently to remove from molds the majority of automobile tires, but in the case of certain tire casings of a thin walled construction where the tire is very flexible, or in the case of molds which may be offset at the center line of the tire, the tire has a tendency to spring back into place, after having been partially separated from the lower mold. The object of the present invention is to devise an auxiliary mechanism which will seize the tire immediately upon the parting of the two mold sections and hold it firmly at one point on the upper mold section so that it cannot spring back into the lower mold section, but is carried upwardly with the upper mold section until it is completely freed from the lower mold section. The tire usually remains held between the auxiliary mechanism and the upper mold section until it is removed from the mold by the operator.

In the disclosure herein the best known and preferred form of the invention is shown in conjunction with the press of the former application, but it will be understood that the broad idea of the present invention in providing the auxiliary stripping means may be modified to adapt the invention to other forms of vulcanizing presses.

In the drawings:

Fig. 1 is a side view of a press of the self-stripping type such as shown in my prior application with the auxiliary stripping mechanism mounted thereon, the press being closed and the mold being shown in section with the tire therein.

Fig. 2 is a similar view showing the tire partially stripped with the auxiliary stripping means in position and showing in dotted lines the approximate path of travel of the auxiliary stripping device.

Fig. 3 is a view showing the press fully opened with the tire suspended therein out of contact with the section except at the gripping point.

Fig. 4 is a front view of the press.

Fig. 5 is an enlarged detail section of the means for operating the auxiliary device.

Fig. 6 is an enlarged detail of the arm which supports the auxiliary stripping device.

Fig. 7 is a partial side view showing the means for imparting a stripping action by the mold sections per se during the opening movement of the press.

The vulcanizing press to which this invention may be applied as shown in the drawings comprises the base 1 upon which is supported the lower half of an automobile tire mold 2. The upper half of the tire mold 3 is secured to a movable platen 4, carried upon rocking arms 5 to which it is pivoted by the transverse shaft 6. Near its upper end the arms 5 are pivoted at 7 to parallel pressure links 8 which are mounted at their lower ends on the shaft 9 in the base. To the upper end of the rocking arms are connected the links 10, the opposite ends of which are connected to crank arms 12 secured to the face of the main operating gears 14, mounted on the main operating shaft 15 and rotated by a pinion 16 from the drive shaft 17.

As is fully described in the pending application above identified, the upper mold section 3 through its platen 4 and a rearwardly extending arm 18 is guided in its opening movement so that in the initial opening movement it is drawn or shifted backwardly and rearwardly at a generally oblique angle so that the tire T with its air bag B is compressed transversely between the forward portion of the upper mold and the rear portion of the lower mold while the non-skid formations of the tread design are in engagement with the tire. This action causes the tire to strip from the mold by the continued movement of the upper section as it moves to fully open position, and where the tire is sufficiently sturdy, or when the mold is divided on the center line of the tire, it is readily stripped from the mold, thus making unnecessary the provision of the auxiliary stripping means which is the subject of this application.

The mechanism for accomplishing the stripping action described in the previous paragraph and contained in said pending application is shown in Fig. 7 and includes means for rotating the drive shaft 17 comprising a worm gear 50 fixed to shaft 17 and contained in a motor housing 51, said gear being driven by a worm 52 on the vertical armature shaft 53 of a driving motor 54. The lower ends of arms 18 are forked as at 57 and pass on either side of the main operating shaft 15. On one face of each fork and near its upper end is a roller 58 which may be designated as the lifting roller, and on the opposite face of each fork on the side removed from the mold is a roller 59 which may be designated as the dragging roller. Each roller 58 rides upon a lifting cam 60 and each roller 59 is actuated by a dragging cam 61, which cams are fixed to the shaft 15 and, in cooperation with the arms 5, links 8 and links 10, direct and guide the upper mold in its stripping movement.

In the drawings the tire mold is shown divided off center, i. e., the lower half of the mold on its outer circumference overhangs the tire so that the tendency to hold the tire by the lower mold section is accentuated and while the tire will start out of the lower mold at the beginning of the opening movement, it will spring back into the lower mold section as the upper mold section continues its rocking movement. In the case of tires which are light and more flexible than the average, the difficulties of stripping are increased.

For meeting the conditions stated, the present invention provides a gripper which is designed to enter between the faces of the upper and lower mold sections beneath the tire as the mold opens and to seize the lower face of the tire before it springs back into place. The specific form of gripper shown herein is in the nature of a bar or rod having connected with it an operating mechanism which causes it to follow the surface of the lower half of the mold from the front to a point substantially below the median line or widest part of the tire and then to rise with the upper mold, gripping the tire against the upper mold so firmly that it cannot spring back into the lower mold, but will be carried out of the lower mold and suspended as shown in Fig. 3. In addition to insuring the positive stripping of the tire, it is immediately removed from contact with the heated mold sections and the vulcanization of the tire is immediately arrested, even if the attendant is not present to remove the tire as soon as the mold opens. As these presses are now accurately timed and automatically opened, the duration of the curing period is more accurately governed than in prior constructions.

The conception of means to accomplish this purpose is broadly new and other means may readily be designed to accomplish the same result and it is the intention to cover means operating upon the same general principle and embodying the broad invention set forth in the claims.

The specific form of auxiliary stripping device shown comprises a horizontal rod or bail 20 mounted on the lower ends of two parallel swinging arms 21 which are dependent from and secured to bell crank levers 22 pivoted on a rod 23 on the end of arms 25 and extending across the mold. These arms 25 are secured to the upper platen and for the purposes to be later described may be pivoted as at 26, each arm being provided with a slot 28 received over a pin 29 carried on the upper platen, it being stated that this is a refinement of the invention for meeting special conditions and is not essential in normal operation.

When the press is closed the rod or bar 20 lies against the mold below the parting line and in the opening movement of the press rises upwardly on the mold until it reaches the upper face and then moves inwardly and then upwardly in the path illustrated in dotted lines in Fig. 2 until the tire is gripped, whereupon the gripping mechanism moves with the mold to fully open position.

This action is accomplished by means of operating links 30, which may be arranged in pairs as shown, although with the smaller sizes of press the provision of one operating link will suffice. Each link 30 extends upwardly and is received in a friction shoe shown in Fig. 5. This shoe consists of plates 32 and 33 located on opposite sides of the link and provided with friction linings 35 which bear against the sides of the links with sufficient pressure to operate the rod 20, but to permit the slippage of the link in the shoe when the rod is prevented or retarded in its movement by any obstruction which it meets during its travel. The pressure of the friction surfaces is adjusted by means of bolts 36, here shown as four in number, mounted in the rear plate 32 and having adjustable nuts 37 between which and the outer face of the plate 33, are the compression springs 38. In this way the friction exerted by the shoe may be adjusted.

The friction shoe is pivoted by means of the stud 40 on a bracket 41 secured to the face of the arm 5, the location of the shoe at this point being admirably suited for the purposes of the invention as in the operation of the press the rocking movement of the arm 5 is much more rapid than the movement translated to the upper mold half so that the rod 20 enters the space between the mold halves quickly so as to arrive on the opening movement in its position below the tire before the tire has an opportunity to spring back into the mold. In the closing movement the action of the gripping means for the tire is equally rapid and danger of the rod being caught between the molds is prevented. The extent of movement of the arm 20 is limited in its inward movement by the adjustable bolt 45 mounted in the bell crank leveer 22 and arranged to strike against a lug on the arm 25. In its outward movement the motion of the arm is arrested by the adjustable bolt 46, mounted in the lug and located in the path of the bell crank lever.

The operation of the auxiliary stripping attachment may be briefly described. In the closed position the bar 20 rests against the front of the mold. As the mold is opened at the end of the cure by the mechanism described, the bar travels up the face of the mold, being moved by the action of the friction shoe on the link 30 and the elevation of the upper mold section. As the swinging action of the arm is retarded by the mold, the friction shoe will slide on the link until the bar is free to move inwardly along the top face of the lower mold. The swinging movement continues until the bolt 45 strikes the lug on the arm, whereupon it is located beneath the median line of the tire and is in such position that the tire is gripped against the upper mold section. Continued movement of the upper mold section carries the tire together with the upper mold section while the friction shoe moves over the link until the fully opened position shown in Fig. 3 is reached. The operator may then seize the tire and remove it from the press, the link 30 being elongated sufficiently to permit the bar to swing if necessary without disengaging the shoe. On the closing movement, after an unvulcanized tire is placed in the lower mold section, the first operation is through the pressure shoe acting on the link 30, which swings the bar 20 out of the mold until the bell crank strikes the stop 46, whereupon the friction shoe slides along the bar to its original position.

It sometimes occurs that in the opening movement the operator may desire to reverse the mold before the parts have reached the position shown in Fig. 2 and while the bar is in contact with the face of the lower mold. The closing movement of the press in such a case would tend to bind the bar against the lower mold and prevent its withdrawal. If the arm 25 were rigid the binding effect of the bar on the face of the mold would be greater than the force exerted by the friction shoe and no outward movement would be imparted to the bar. For meeting this emergency the arms 25 are pivoted as described. Normally the arms 25 rest carried on the bolts 29. The closing movement of the press will relieve the binding effect of the bar on the face of the mold, by the upward movement of the arms 25 imparted by the contact of the bar with the lower mold and this will release the bar sufficiently to permit it to be moved out of the way.

Having explained the invention in its best known and preferred form it will be understood that modifications and adaptations of the invention may be made without departing from the essential features thereof as set forth in the claims. It is also possible to adapt the principles of the invention to the molding or vulcanization of other articles than tires in which it is desired to facilitate the removal of the articles upon the opening of the press.

What is claimed is:

1. The combination with a press of the type comprising separable upper and lower mold sections movable away from each other to open the press until an article within the mold is only partially retained in both mold sections, of a gripping device cooperating with the upper mold section to grip said article between the upper mold section and said gripping device and located outside the mold cavity when the press is closed, and yielding means carried by the press to move the gripping device from a position outside the mold cavity to a position between the mold sections and beneath the portion of the article retained in the upper mold section.

2. The combination with a tire press of the type having upper and lower mold sections containing respective cavities of unequal depth in which a tire is partially stripped from both mold sections during the opening movement of the press, of a gripping device carried by the press and cooperating with the mold section containing the cavity of least depth to grip said tire between said last mentioned mold section and said gripping device, said gripping device being movable from a position outside the mold sections at the beginning of the press opening movement to a position between the tire and the mold section containing the cavity of greatest depth, and mechanism carried by the press and operable in timed relation to the opening of the press for moving said device.

3. The combination with a tire press comprising upper and lower mold sections at least one of which is movable to open the press, of a substantially horizontal swinging rod carried by the press and cooperating with the movable mold section to grip a portion of a tire between said rod and said movable mold section, said rod being swingable on the press upon opening movement of the press from a position outside the mold sections to a position between the tire and said other mold section to so grip the tire, said rod also being movable with the movable mold section to retain said grip on the tire, and means for swinging the rod.

4. The combination with a tire press comprising upper and lower mold sections at least the upper section of which is movable to open the press, of a substantially horizontal rod carried by the press and cooperating with the upper mold section to grip a portion of a tire between said rod and said upper mold section, said rod being automatically swingable upon opening movement of the upper mold section from a position outside the mold sections to a position between the tire and the lower mold section to so grip the tire, said rod also being movable with the upper mold section to retain said grip on the tire, and yielding means to swing the rod.

5. The combination with a press comprising a pair of complementary mold sections at least one of which is movable to open the press, of a swinging arm on said press carrying an article engaging member at the free end thereof cooperating with said movable mold section to grip an article between said article engaging member and said last mentioned mold section, said arm and member being located outside the mold sections when the press is closed, and means carried by said press for swinging said arm and member upon opening movement of the press to move said member to a position between said article and said other mold section to so grip said article, said arm and member also being movable with the movable mold section to retain said grip on the article.

6. In a tire vulcanizing press the combination of upper and lower mold sections at least the upper section of which is movable to open the press, a pivoted arm on said press carrying a tire engaging member at the lower end thereof cooperating with said upper mold section to hold a tire between said member and said upper mold section, said arm and member being located outside the mold sections when the press is closed, said arm pivoting upon opening movement of the upper mold section to swing said member between a tire in the press and said lower mold section.

7. The combination with an article vulcanizing press comprising upper and lower mold sections at least the upper section of which is movable to open the press, of a stripping device carried by the press and located outside the mold sections when the press is closed, said device being operable to enter the space between the mold sections at the beginnnig of the opening movement of the press and to engage a portion of an article partially stripped from said lower mold section so that said article will be between said device and a part of said upper mold section, and mechanism carried by the press and operated by the movement of said upper mold section to operate the stripping device.

8. The combination with a press of the type comprising a pair of complementary mold sections in which a vehicle tire is partially stripped from at least one of said mold sections during the opening movement of the press, of a gripping member carried by the press and located outside the mold sections when the press is closed, said gripping member being movable upon the opening of the press between the tire and one of said mold sections at the point of separation of said tire from said last mentioned mold section, and actuating mechanism for the gripping member carried by the press, said mechanism being operable in timed relation to the operation of the press to move said member to said point and clamp the tire against the other mold section during the opening movement of the press, said mechanism being also operable to return the gripping member to its initial position during the closing movement of the press.

9. The combination with a press of the type comprising separable upper and lower mold sections movable away from each other to open the press, of an article gripping device cooperating with one of said mold sections to grip an article in the mold between said last mentioned mold section and said gripping device and located outside the mold cavity when the press is closed, and means including a friction creating medium carried by the press to move the gripping device from a position outside the mold cavity to a position between the mold sections.

10. A vulcanizer press for pneumatic tires comprising a pair of cooperating mold elements, means for relatively moving said mold elements apart by a lateral shifting and separating movement such that the cured article in the press is gripped at opposite sides respectively by said respective mold elements, and means movable with one of said mold elements for engaging automatically with and supporting, upon separation of said mold elements, that side of the cured article facing the other mold element.

11. A vulcanizer press for pneumatic tires comprising a pair of cooperating mold elements, means for relatively moving said mold elements apart by a lateral shifting and separating movement such that the cured article in the press is gripped at opposite sides respectively by said respective mold elements, and means movable with one of said mold elements and adapted to enter the space between said mold elements upon separating movement thereof and engage with and support the cured article to separate the same from the other mold element.

12. A vulcanizer press for pneumatic tires comprising a pair of cooperating mold elements, means for relatively moving said mold elements apart by a lateral shifting and separating movement to compress the tire diametrically between diagonally opposite areas on the tread surface and grip the tire at such areas respectively by said respective mold elements, and means movable into engagement with the ungripped area of the cured tire facing one of said mold elements to strip such ungripped area from such mold element, said ungripped area being adjacent the gripped area facing the other of said mold elements.

13. A vulcanizer press for pneumatic tires comprising a pair of cooperating mold elements, means for relatively moving said mold elements apart by a lateral shifting and separating movement to compress the tire diametrically between diagonally opposite areas on the tread surface and grip the tire at such areas respectively by said respective mold elements, and means movable into engagement with the ungripped area of said tire adjacent one of said gripped areas facing one of said elements for effecting an additional stripping action of the tire from the other of said elements.

14. A vulcanizer press for pneumatic tires comprising a stationary mold element and a movable mold element, means for relatively moving said mold elements apart by a lateral shifting and separating movement to compress the tire diametrically between diagonally opposite areas on the tread surface and grip the tire at such areas respectively by said respective mold elements, and a stripper arm carried by said movable element movable into engagement with the ungripped area of said tire adjacent the area gripped by said movable element for effecting an additional stripping action of the tire from said stationary element.

LESLIE E. SODERQUIST.